United States Patent [19]

Barley

[11] 4,274,516
[45] Jun. 23, 1981

[54] ROTARY VIBRATION DAMPERS

[75] Inventor: Geoffrey W. Barley, Kislingbury, England

[73] Assignee: UOP Inc., Des Plaines, Ill.

[21] Appl. No.: 39,635

[22] Filed: May 16, 1979

[30] Foreign Application Priority Data

May 20, 1978 [GB] United Kingdom ............... 20979/78

[51] Int. Cl.³ ............................ F16F 9/14; F16F 9/34
[52] U.S. Cl. ........................................ 188/310; 16/58; 192/58 A; 251/318
[58] Field of Search ............... 188/306, 309, 310, 293, 188/290, 271, 312; 192/58 A, 109 D; 16/58; 251/318

[56] References Cited

U.S. PATENT DOCUMENTS

| | | | |
|---|---|---|---|
| 1,666,225 | 4/1928 | Ward | 188/312 |
| 1,890,713 | 12/1932 | Zuber | 188/310 |
| 2,059,991 | 11/1936 | Goehring | 251/318 |
| 2,478,612 | 8/1949 | Walma | 188/271 |
| 3,045,780 | 7/1962 | Lees | 188/290 |
| 3,140,761 | 7/1964 | Doolittle | 188/290 |
| 3,650,359 | 3/1972 | Nash | 188/310 |
| 3,651,903 | 3/1972 | Butler et al. | 188/290 |

FOREIGN PATENT DOCUMENTS 1336631 11/1973 United Kingdom.
1488390 10/1977 United Kingdom.

Primary Examiner—George E. A. Halvosa
Attorney, Agent, or Firm—James R. Hoatson, Jr.; Barry L. Clark; William H. Page, II

[57] ABSTRACT

A rotary vibration damper comprises one or more vanes secured to a rotor within a housing filled with damper fluid, the vane or vanes cooperating with one or more fixed walls to define complementary fluid-filled chambers within the housing between which fluid will flow as relative vibratory movement occurs between the housing and the vane or vanes. A partition wall movable axially within the housing like a piston is spaced from one end of the vane or vanes to define a restricted path for the flow of damper fluid between complementary chambers. The restriction of the flow path, and hence the vibration damping effect, can be increased or decreased by axial movement of the partition wall.

6 Claims, 2 Drawing Figures

ROTARY VIBRATION DAMPERS

BACKGROUND OF THE INVENTION

This invention relates to rotary vibration dampers.

It is known to provide a rotary vibration damper comprising one or more vanes secured to a rotor and mounted for rotational oscillatory movement within and relative to a housing, the housing having an arcuate wall and other walls co-operable with said vane or vanes to define chambers which are filled with damper fluid and whose volumes are complementary, their relative volumes being variable in dependence on the position of the vane or vanes, the complementary chambers being interconnected by one or more restricted fluid flow paths through which vibration-damper fluid can flow at a restricted rate, and a flow control member movable to vary the flow area of said one or more flow paths.

An object of the present invention is to provide, in such a vibration damper, a simple arrangement for varying the flow area of the restricted flow path or paths.

BRIEF SUMMARY OF THE INVENTION

This is achieved, according to the invention, in that the flow control member is a wall member which is movable along the rotary axis of the vane or vanes within a space filled with damper fluid, the flow area of the restricted flow path or paths being dependent on the axial position of said member.

In particular, the wall member is a partition wall and the restricted flow paths are defined between the partition wall on the one hand and the vane or vanes and the walls which separate the complementary chambers on the other hand.

Preferably the partition wall is mounted as a piston within the housing, and a leakage path for damper fluid is provided through or around the partition wall to allow a leakage flow of damper fluid to pass from one side of the partition wall to the other and thereby permit said axial movement of the partition wall.

BRIEF DESCRIPTION OF THE DRAWINGS

One embodiment of a rotary vibration damper will now be particularly described by way of example with reference to the accompanying drawing in which.

DETAILED DESCRIPTION

Figure 1:
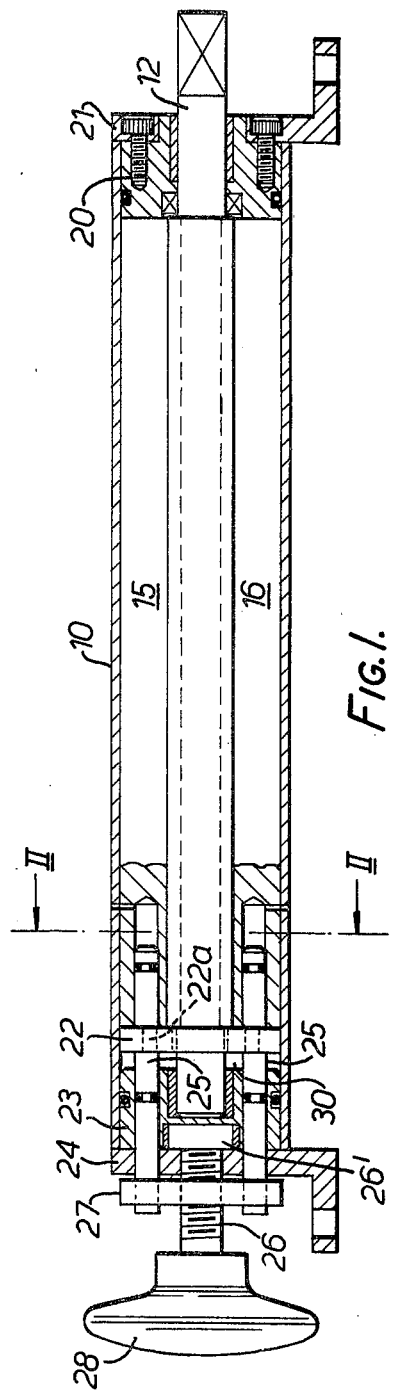
FIG. 1 is an axial section through the vibration damper.

The vibration damper as shown comprises a cylindrical housing 10 containing a rotary vane device 11 formed by a spindle 12 on the axis of the housing and two oppositely directed radial vanes or vane portions 13, 14. Two fixed walls 15, 16 extend from diametrically opposite positions on the housing up to the spindle 12 to divide the interior of the housing into a first complementary pair of chambers 17a, 17b on opposite sides of vane portion 13 and a second complementary pair of chambers 18a, 18b on opposite sides of vane portion 14. Clearly the number of pairs of complementary chambers can be increased or decreased in accordance with the number of vane portions. The total volume of the chambers will be substantially constant but their relative volumes will depend on the position of the vane. In operation, these chambers are filled with damper fluid.

The chambers 17a, 17b, 18a, 18b are bounded at one end by a bearing block 20 secured to the inside of an end wall 21 of the housing, the block 20 and end wall 21 having a central aperture in which the spindle 12 is sealed and through which the spindle extends for connection externally to the part whose vibration is to be damped.

At their opposite end, the chambers 17a, 17b, 18a, 18b open on to a partition wall 22 having a central aperture through which the opposite end of the spindle 12 extends. The extremity of the spindle 12 is received in a bearing block 23 which block is sealed within the housing on the inner side of a second end wall 24 of the housing.

The partition wall 22 is thus located in a constant volume chamber 30 defined within the housing between the bearing block 23 and the adjacent ends of vane device 11 and fixed partition wall 15, 16. In operation this chamber is filled with damper fluid and forms a constant volume reservoir communicating with the chambers 17a, 17b, 18a, 18b.

The space between partition wall 22 and the adjacent end of vane device 11 provides restricted flow paths for damper fluid between complementary chambers. To enable the wall 22 to be moved like a piston towards and away from vane device 11 thereby to vary the width of the flow paths, the wall 22 is fixed to a parallel spaced pair of guide rods 25 which are slidably received at their opposite ends in guide openings in the bearing block and fixed partition walls 15, 16. The movement of wall 22 is effected by a screw 26 journalled at one end in the end wall 24 of the housing and retained axially in bearing block 23 by an enlarged portion 26' integral with the end of screw 26, screw 26 engaging in a screw-threaded aperture in a yoke 27 secured to the external ends of the guide rods 25. A handle 28 on the outer end of the screw 26 is rotatable to move the yoke 27 and guide rods 25 and hence move the partition wall 22. The guide rods 25 are sealed in their respective guide apertures. To provide a leakage path for damper fluid between opposite sides of the movable partition wall 22, the wall 22 is formed with apertures 22a, or is made a slightly loose fit within the housing.

In operation, the vibration damper is first filled with damper fluid. The handle 28 is then rotated to advance the movable partition wall 22 towards, or withdraw it from, the adjacent end face of the vane device 11 thereby varying the width of the restricted flow path between complementary chambers 17a, 17b, and 18a and 18b and hence varying the opposition which the vane presents to oscillatory movement of the spindle relative to the housing.

Figure 2:
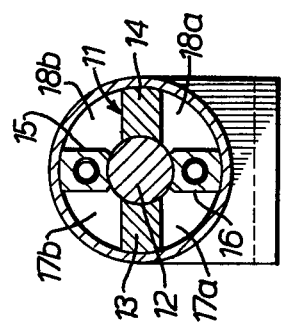
FIG. 2 is a section on the line II—II of FIG. 1.

As the vane device 11 oscillates, clockwise movement of the vane as seen in FIG. 2 will reduce the volume of chambers 18a, and 17b, and will increase the volume of chambers 17a and 18b. Anticlockwise movement of vane device 11 will increase the volume of chambers 18a, 17b and reduce that of chambers 17a and 18b. The damper fluid displaced by the movement of the vane will flow across the end of vane device 11 and across the end of partition walls 15, 16 from the chambers of decreasing volume to the chambers of increasing volume, the restriction to this flow and hence the magnitude of the damping effect, being variable by axial displacement of the partition wall 22.

Although the invention has been described in terms of a vane having two oppositely-directed vane portions, it will be evident that three, four or more vane portions could alternatively be employed.

What is claimed is:

1. A rotary vibration damper comprising,
a housing,
a rotor,
one or more vanes secured to said rotor,
means mounting said rotor for rotational oscillatory movement within and relative to said housing,
the housing having an arcuate wall and other walls co-operable with said vane or vanes to define chambers which, in use, are filled with damper fluid and whose volumes are complementary, the relative volumes of the complementary chambers being variable in dependence on the rotational position of the vane or vanes,
means defining one or more restricted fluid flow paths interconnecting the complementary chambers through which vibration-damper fluid can flow at a restricted rate,
the damper further comprising
a partition wall member and,
means mounting said partition wall member for movement along the rotary axis of the vane of said damper within a constant volume damper fluid-filled space and the flow area of the restricted flow path or paths being dependent on the axial position of said member, said partition wall member being a piston mounted within the housing and having a leakage path through or therearound to allow a leakage flow of damper fluid to pass from one side of the partition wall member to the other and thereby permit said axial movement of the partition wall member.

2. A rotary vibration damper according to claim 1 wherein the housing has end walls spaced apart on the axis of the rotor, and the means mounting the said partition wall member comprise a screw passing axially through one said end wall of the housing, said partition wall member being carried on one end of the screw and a handle being carried on the other end of the screw externally of the housing.

3. A rotary vibration damper according to claim 1 wherein the means mounting said partition wall member further comprise guide rods extending parallel to the axis of the rotor and received in guide apertures in the housing.

4. A rotary vibration damper comprising one or more vanes secured to a rotor and mounted for rotational oscillatory movement within a cylindrical housing which is filled with damper fluid, the housing having walls cooperable with said vane or vanes to define working chambers within the housing whose volumes are complementary, relative volumes of the complementary chambers being variable in dependence on the rotational position of the vane or vanes, the complementary chambers being interconnected by at least one restricted fluid flow path through which said damper fluid can flow at a restricted rate, a piston-like partition wall mounted within the housing and movable along the axis of the housing to cause damper fluid to enter, or allow damper fluid to leave, the working chambers, and a positioning device for moving the partition wall and positively locating it at any of a plurality of different axial positions whereby the size of the fluid flow path defined between the partition wall and the adjacent end of the vane or vanes can be varied by a selected amount to vary the restriction to fluid flow in this path and hence the vibration damping effect, and one or more apertures being provided which form a flow path for fluid between opposite sides of the partition wall and which thereby permit axial movement of the partition wall relative to the housing.

5. A rotary vibration damper according to claim 4 wherein the partition wall is mounted for movement on a screw, the screw passing axially through an adjacent end wall of the housing and carrying a handle externally of the housing, such that rotation of the handle is effective to turn the screw and move the partition wall axially of the housing, said screw, handle and end wall forming said positioning device.

6. A rotary vibration damper according to claim 5 wherein the movable partition wall is mounted on guide rods extending parallel to the axis of the vane and received in guide apertures in the housing.

* * * * *